United States Patent
Kaner

[11] Patent Number: 5,942,972
[45] Date of Patent: Aug. 24, 1999

[54] EARLY LIGHTING OF BRAKE-LIGHTS IN VEHICLES

[75] Inventor: Avigdor Kaner, Arda, Israel

[73] Assignee: Baran Advanced Technologies, Omer, Israel

[21] Appl. No.: 08/913,496

[22] PCT Filed: Apr. 4, 1996

[86] PCT No.: PCT/US96/04621

§ 371 Date: Dec. 15, 1997

§ 102(e) Date: Dec. 15, 1997

[87] PCT Pub. No.: WO96/31364

PCT Pub. Date: Oct. 10, 1996

[30] Foreign Application Priority Data

Apr. 6, 1995 [IL] Israel ........................................ 113285

[51] Int. Cl.$^6$ ..................................................... B60Q 1/44
[52] U.S. Cl. ...................... 340/479; 340/467; 307/10.8; 315/77; 315/80
[58] Field of Search ..................................... 340/479, 467, 340/464, 463, 468, 471; 307/10.8; 315/77, 80

[56] References Cited

U.S. PATENT DOCUMENTS 3,089,129 5/1963 Nassikas et al. .
3,336,450 8/1967 Rainer .
3,501,742 3/1970 Ellison .
3,794,972 2/1974 Van Ostrom ........................... 340/467
4,712,098 12/1987 Laing .
4,916,431 4/1990 Gearey .
4,952,909 8/1990 Caine .
4,959,634 9/1990 Miller .
5,023,599 6/1991 Mitchell et al. ....................... 340/467
5,210,522 5/1993 Hoekman .
5,387,898 2/1995 Yeheskel et al. .
5,589,817 12/1996 Furness .................................. 340/467
5,757,949 5/1998 Kinoshita et al. ..................... 340/467
5,805,060 9/1998 Schroeder .............................. 340/467

FOREIGN PATENT DOCUMENTS 2 640 918 6/1990 France .
42 36 395 5/1994 Germany .

Primary Examiner—Nina Tong
Attorney, Agent, or Firm—Merchant, Gould, Smith, Edell, Welter & Schmidt, P.A.

[57] ABSTRACT

A safety system for early lighting of stop lights in vehicles comprises the step of measuring the negative rate of change in the fuel supply to the engine, and converting same to an electronic analog or digital value; the step of comparing the value corresponding to the negative rate of change in the fuel supply to the engine to a preassigned threshold level; and the step of lighting the stop lights if the value is larger than the threshold value.

7 Claims, 2 Drawing Sheets

5,942,972

EARLY LIGHTING OF BRAKE-LIGHTS IN VEHICLES

This application is a continuation of a 371 PCT/US96/04621, filed Apr. 4, 1996.

FIELD OF THE INVENTION

The invention is an improvement to devices which anticipate braking and cause early lighting of stop lights in vehicles. The invention substantially reduces false alarms from which current systems suffer due to differences in driving behavior among different drivers, by learning the behavior of individual drivers, and adapting the system to act according to the driver using the vehicle.

BACKGROUND OF THE INVENTION

Safety systems for early lighting of stop lights in vehicles (hereinafter shortly referred as the "systems") are well known in the vehicle industry, and have become an integral part of many vehicles The systems try to foresee when the driver releases the pressure on the accelerator pedal or shortly thereafter, if he intends to activate the brakes, and if so, immediately to light the rear stop lights. If the system determines that the driver released the acceleration pedal with no intention to activate the brakes, no early lighting is activated. These systems can normally reduce approximately 0.250 second from the interval between the time that the driver decides to brake until the stop lights are actually lighted, a reduction that in many cases can be critical Examples for such systems can be found in U.S. Pat. No. 3,089,129, U.S. Pat. No. 3,501,742 and U.S. Pat. No. 4,916,431. Such systems are based on the discovery that a driver releases the acceleration pedal in a different manner when he only intends to decelerate with no intention to activate the brakes, or when activation of the brakes follows. Most systems anticipate the driver intention by sensors which are mounted on the gas pedal or on fuel supply systems and measure the rate of negative change in the fuel supply (hereinafter the terms "sensor" or "sensors" intend to indicate means for measuring the negative rate of change in the fuel supply to the engine). For example, U.S. Pat. No. 4,712,098 describes a system comprising an inertia sensor mounted on the accelerator pedal. In other systems a sensor is mounted on the lever which connects the accelerator cable to the carburetor. In most of the systems, an electronic signal which is relative to the rate of negative change in the fuel supply is provided, and if the signal level is above a predetermined threshold, the system immediately activates the stop lamps. Of course, the predetermined threshold level is a critical parameter which should be carefully selected.

However, systems of this type have been found to suffer from many false alarms. The term "false alarm" when used herein is intended to indicate cases in which the brake lights are switched on by the system when the driver has no intention to activate the brakes. Such failures of estimating the driver's intention can even be dangerous, when false lighting of the stop lights cause drivers of following vehicles suddenly to activate their brakes, when this is not necessary, and in some cases accidents may occur. One way for reducing the number of false alarms is to increase the threshold level, but this can cause the system not to operate when its operation is required.

It is a purpose of the invention to increase the reliability of systems for early lighting of stop lights by reducing the number of false alarms. Specifically, the invention intends to reduce or eliminate the number of times in which the system early lights the stop lights, when brake activation by the driver does not follow.

It is an object of the invention to adapt the system to specific drivers who may drive the vehicle, more partly, to provide a system that will learn the driving behavior of specific drivers, and accordingly establish a specific threshold for each driver.

It is also an object of the invention to provide said improvements at a relatively very low cost and low volume.

Other purposes and advantages of the invention will become apparent as the description proceeds.

SUMMARY OF THE INVENTION

The safety system for early lighting of stop lights in vehicles, according to the invention comprising means for measuring the negative rate of change in the fuel supply to the engine, converting same to an electronic analog or digital value, means for comparing said value to a preassigned threshold level and means for lighting the stop lights if said value is higher than said threshold level, and characterized in that it comprises means for adapting the system to the driving behavior of the driver actually driving the vehicle, which means comprise means for storing in memory means, hereinafter referred to also as "register", the value correspond to negative rates of change in the fuel supply to the engine which are actually followed by brake activation processing means for reading all values recorded in said register, averaging them, and assigning the resulting average as a reference value, and means for updating the threshold value by an amount which is dependent from the said reference value.

According to a preferred embodiment of the invention the processing means comprise a microprocessor or a microcontroller, and the means for registering in a register the values corresponding to the negative rate of change in the fuel supply to the engine and which are actually followed by braking activations, is the memory of said microprocessor or a microcontroller.

According to a preferred embodiment of the invention the means for measuring the negative rate of change in the fuel supply to the engine comprise sensors which generate a signal relared to the movement of the accelerator pedal.

According to another preferred embodiment of the invention, the means for measuring the negative rate of change in the fuel supply to the engine, comprise sensors measuring the movement of the accelerator lever in the carburetor.

According to still another preferred embodiment of the invention the processing means and the means for registering the negative rate of change in the fuel supply to the engine are associated with the built-in vehicle computer.

The invention further includes a method for learning the braking behavior of drivers, and setting a threshold value related to the specific driver actually driving the vehicle which comprising performing the following:

setting an initial threshold value;

sensing a negative rate of change in the fuel supply to the engine;

measuring the negative rate of change in the fuel supply to the engine and converting the same to an electronic value;

recording in a memory means the values corresponding to negative rate of change in the fuel supply to the engine which are actually followed by braking activations;

averaging all values recorded in said memory means, and assigning the result as a reference value; and adjusting the threshold value by an amount which is directly related to the said reference value;

DETAILED DESCRIPTION OF PREFERRED EMBODIMENT

Figure 1:
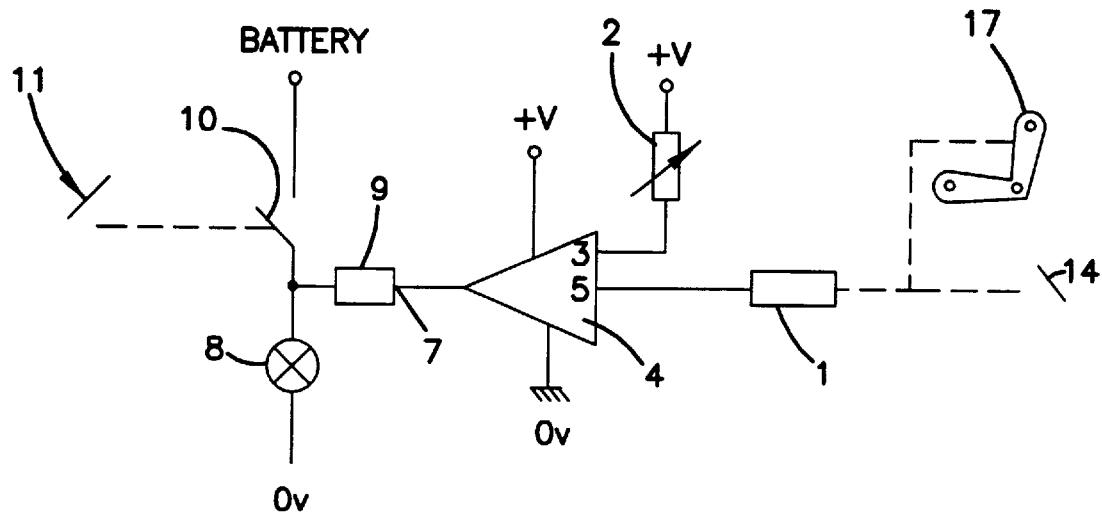
FIG. 1 diagramatically illustrates a system for early lighting of stop lights in vehicles, according to the prior art.

FIG. 1 illustrates a general diagram of a typical prior art system for early lighting of stop lights in vehicles. Numeral 1 indicates the gas sensor which senses the rate of negative change in the gas supply to the engine, sensors which may be located for example near the gas pedal, near the lever which connects the carburetor to the acceleration cable or elsewhere, as hereinbefore set forth. Numeral 2 indicates an adjustable component (in this case a variable resistor) for assigning a voltage threshold level to be fed to input point 3 of comparator 4. The sensor 1 provides an electric voltage level which directly corresponds to the rate of negative change in fuel supply to the engine, measurement which for example may be taken from the acceleration pedal 14 or from the carburetor lever as hereinbefore set forth The sensed voltage level is transferred to input point 5 of comparator 4, which compares said sensed level to the preassigned threshold level. If the level is above the threshold level, the system assumes that the driver intends to brake, and supplies a positive voltage through line 7 and timer 9 to the filaments of the stop lamps 8 in order to light them. Numeral 11 indicates the brakes pedal, and numeral 10 indicates the conventional brakes switch associated with the brakes pedal. In said prior art systems, a fixed threshold level is preassigned based on previous experience. Then, each time that the comparator receives a signal through point 5 indicating a level above the threshold level, the comparator activates the stop lights. Timer 9 disconnects the early lighting voltage from the stop lamps after a preassigned short period, whereby to connect the lamps to the voltage supply of the regular braking system. Timer 9 is important especially in cases when faulty initiation of early lighting occurs.

However, as previously stated, it has been found that different drivers have different driving behavior and this substantially affects the system performance and causes many false alarms, that reduce the system reliability, and even can cause accidents.

The invention provides a system that adapts itself to the driving behavior of the driver actually driving the vehicle, and even continuously corrects the threshold level hereinafter the term "level" corresponds to the rate of negative change in the fuel supply to the engine, above which early activation of the stop lights is desired) according to the actual driving behavior of the driver, a behavior which may change from time to time. The invention provides an addition of a small processing unit such as a basic digital microprocessor or a microcontroller to the system. The purpose of the small processing unit is to learn the behavior of specific drivers, and to estimate whether, when a driver reduces pressure on the accelerator (e.g., removes his foot from the accelerator pedal), he intends actually to brake (e.g., presses the brake pedal). The processor assigns to different drivers a different threshold level for activating early lighting. The processing units can be relatively simple and basic because the operations which have to be performed by the circuit are quite simple, basic and repetitive. Such processing units exist in the market in a very low price, and occupy a relatively small volume. According to another embodiment of the invention, the processing operations can be performed by a microprocessor that already exists in many modern vehicles for providing information to the driver or controlling the functioning of different units of the vehicle such as lights, engines, doors, etc. If this option is chosen, the system of the invention is associated with this microprocessor.

Figure 2:
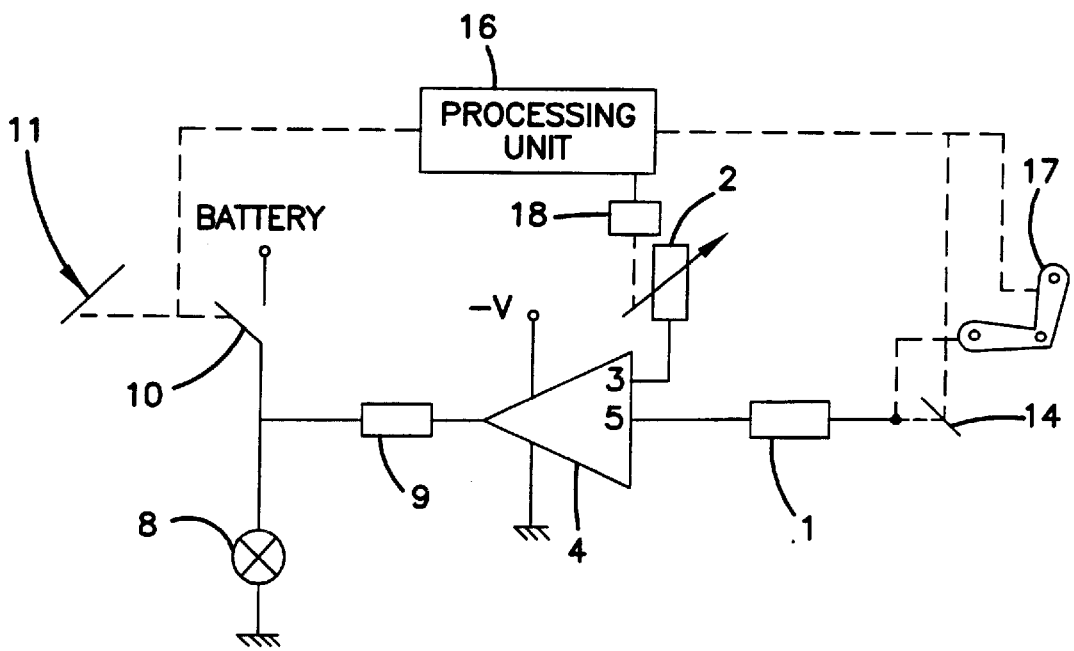
FIG. 2 diagramatically illustrates an improved scheme of a system for early lighting of stop lights in vehicles, according to a preferred embodiment of the invention.

An improved system for early lighting of stop lights in vehicles according to a preferred embodiment of the invention, is shown in a general form in FIG. 2. As in the prior art system, 1 indicates the sensor, 4 indicates a comparator, 17 is the carburetor lever given as an example for the position of the sensors, numerals 11 and 14 indicate the brakes and acceleration pedals accordingly, 9 indicates a timer. A preassigned threshold voltage level that reflects the negative rate of change in fuel supply to the engine is set. The system continuously measures said negative rate of change, and verifies if a specific sensed level is followed or not by an activation of brakes. Each time brakes activation is detected, the corresponding level sensed just before the activation of the brakes is recorded in the register 18. The processing unit 16 averages the levels recorded in the register, and provides a new level directly relative to said average level to be assigned as the new threshold level. This procedure provides a threshold level that is continuously updated and assigned according to the actual braking behavior of the driver. It is recommended that as soon as the vehicle starts, an initial threshold, not dependent on the driver driving behavior be set. Then, the operation of the system will be based initially on this threshold level, which later on will be updated as described.

Figure 3:
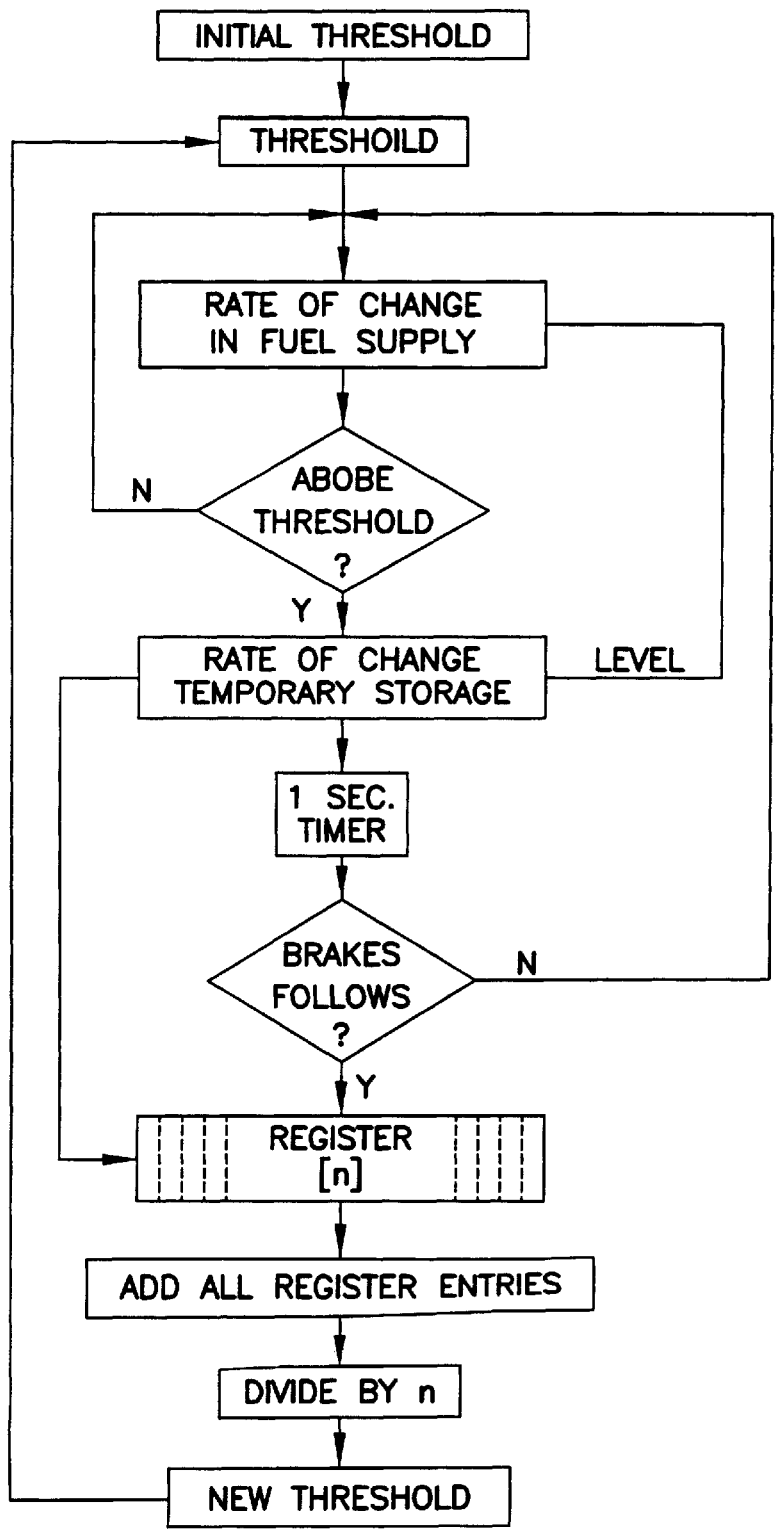
FIG. 3 is a flow diagram which illustrates the operation of the processing unit for learning the braking behavior of the driver, and updating the threshold level accordingly.

FIG. 3 shows the system operation in a flow diagram form. First, an initial threshold is set. Then, a continuous check of the acceleration system is made and, if and only if a rate of change in the fuel supply to the engine which is above the threshold level is sensed, a value representing the sensed threshold level is stored in a temporary storage. Otherwise, the measurement continuous. If measurement above the threshold level is detected, a short interval timer of about 1 second is set in order to check if brakes activation follows the sensed above the level measurement. If no brakes activation follows, the measurement continuous in order to detect a new above the threshold level case. Otherwise, if brakes activation follows the above the threshold level measurement, the level stored in the temporary storage is transferred into an cells register. Then, an average operation is performed for all entries in the register and a new threshold level which is related to said average, is set as the new threshold level in the threshold storage, and all the illustrated process is repeated.

According to another embodiment of the invention, the initial threshold level is the level that had been set when the driver lastly left the vehicle. According to still another embodiment of the invention, in vehicles that are being used by more than one driver, a code may be given to each driver, a specific threshold will be assigned by the system to each driver, and, on starting the vehicle, the driver will key in hie ID code, and the system will set same driver's code.

While embodiments of the invention have been described by way of illustration, it will be apparent that the invention can be carried into practice with many modifications, variations and adaptations, and with the use of the numerous electronics or mechanical equivalents or alternative solutions that are within the scope of the persons skilled in the art, without departing from the spirit of the invention or exceeding the scope of the invention. Especially, it is clear that it is possible to sense sudden release of the gas pedal by mounting sensors in other location in the acceleration system, and also these cases are within the scope of the invention.

I claim:

1. A safety system for early lighting of stop lights in vehicles, which comprises:

means for measuring a negative rate of change in a fuel supply to an engine, and converting same to an electronic analog or digital value;

means for comparing the value corresponding to the negative rate of change in the fuel supply to the engine to a preassigned threshold level; and means for lighting the stop lights if said value is larger than said threshold level;

comprising means for adapting the system to a driving behavior of a driver actually driving the vehicle, which comprises:

means for storing in a register values corresponds to negative rates of change in the fuel supply to the engine which are actually followed by brake activation;

processing means for reading all values recorded in said register, averaging them, and assigning a resulting average as a reference value; and means for updating the threshold value by an amount which is dependent from said reference value.

2. A safety system according to claim 1 wherein the processing means comprises a microprocessor or a microcontroller.

3. A safety system according to claim 1, wherein the means for storing the values corresponding to the negative rates of change in the fuel supply to the engine and which are actually followed by braking activations, is the memory of a microprocessor or a microcontroller.

4. A safety system according to claim 1, wherein the means for measuring the negative rate of change in the fuel supply to the engine comprises a sensor which generate a signal related to the movement of an accelerator pedal.

5. A safety system according to claim 1, wherein the means for measuring the negative rate of change in the fuel supply to the engine, comprises a sensor which measure the movement of an accelerator lever in a carburetor.

6. A safety system according to claim 1, wherein the processing means and the means for storing in a register values corresponds to the negative rate of change in the fuel supply to the engine are associated with a built-in vehicle computer.

7. A method for learning the braking behavior of drivers, and setting a threshold value related to a specific driver actually driving the vehicle, comprising performing the following operations:

setting an initial threshold value;

sensing a negative rate of change in a fuel supply to an engine;

measuring the negative rate of change in the fuel supply to the engine and converting the same to an electronic value;

recording in memory means the values corresponding to negative rate of change in the fuel supply to the engine which are actually followed by braking activations;

averaging all values recorded in said memory means, and assigning the result as a reference value; and adjusting the threshold value by an amount which is directly related to said reference value.

* * * * *